July 16, 1957 J. G. GROBOSKI 2,799,529
RAIN-SHADE HARD-TOP VISOR
Filed July 16, 1956 2 Sheets-Sheet 1

INVENTOR.
JOSEPH G. GROBOSKI
BY
Harry H. Hitzeman
ATTORNEY.

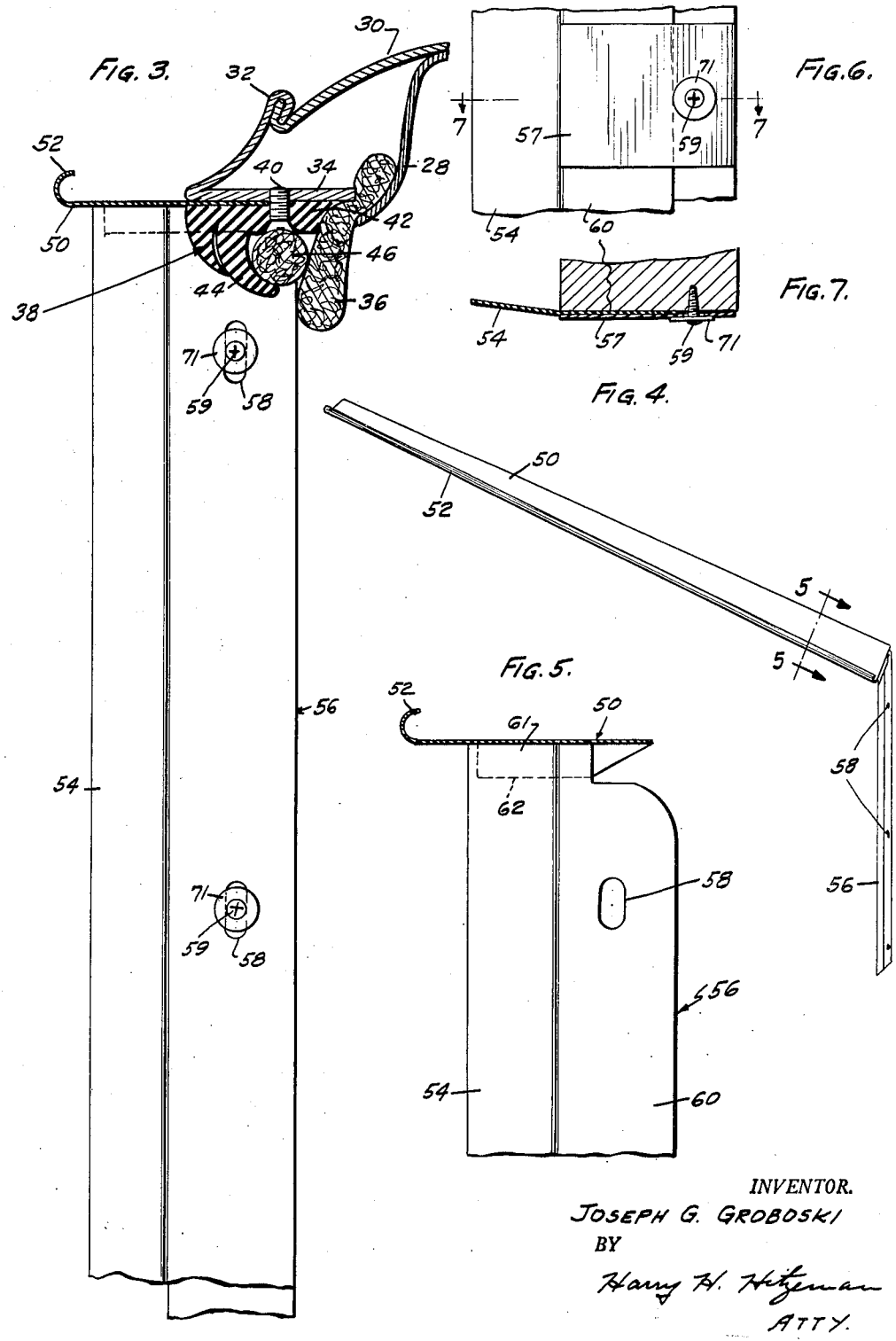

United States Patent Office 2,799,529
Patented July 16, 1957

2,799,529

RAIN-SHADE HARD-TOP VISOR

Joseph G. Groboski, Chicago, Ill.

Application July 16, 1956, Serial No. 598,107

2 Claims. (Cl. 296—44)

My invention relates to visors for the side windows of automobiles.

My invention relates more particularly to side visors for the windows of sports automobiles generally known as "hard-tops," the name coming from the construction of the body in which no door post extends to the roof and the roof being supported only at the windshield and adjacent the back of the back seat.

In automobiles of this type, the windows which move up and down are mounted in comparatively thin peripheral frames and are raised to a closed position in a channel member attached to the edge of the roof or against a rubber extrusion or grommet which is fastened to the underside of the trim portion of the roof or top. These automobiles are usually driven with the windows open or rolled down, leaving only the vent wings near the windshield as a protection or deflector against rain.

The principal object of the present invention is to provide a rain shade for the parallel side edges of the roof or hard-top of automobiles of this type, one which is easily installed and which deflects rain and channels water off to the rear of the car, thus making it possible to enjoy open windows and ventilation in the stormiest of weather, and in addition, leakage around the tops of the open doors is eliminated. Furthermore, the rain visor which I have constructed blends in with the car's trim and graceful sweeping lines, thereby adding smartness to the appearance of the same without being conspicuous.

A further feature of the invention resides in the provision of a support plate or post associated with the rain shade or visor positioned along the front post of the automobile so that in addition to deflecting rain above the edge of the hard-top or roof, a certain amount of noise and roar is also eliminated by the front support plate associated therewith.

For a more comprehensive understanding of the invention and the features thereof, reference is had to the accompanying drawings, upon which:

Fig. 3 is a cross-sectional view through the hard-top or roof along the front post of the door, and is taken generally on the line 3—3 of Fig. 2;

Fig. 4 is a generally front perspective view of the visor and front post support plate which is provided therewith;

Fig. 5 is a cross-sectional view thereof taken on the line 5—5 of Fig. 4;

Fig. 6 is a fragmentary front elevational view of the front post of the automobile, the front post support plate and holder; and Fig. 7 is a cross-sectional view thereof taken on the line 7—7 of Fig. 6.

Figure 1:
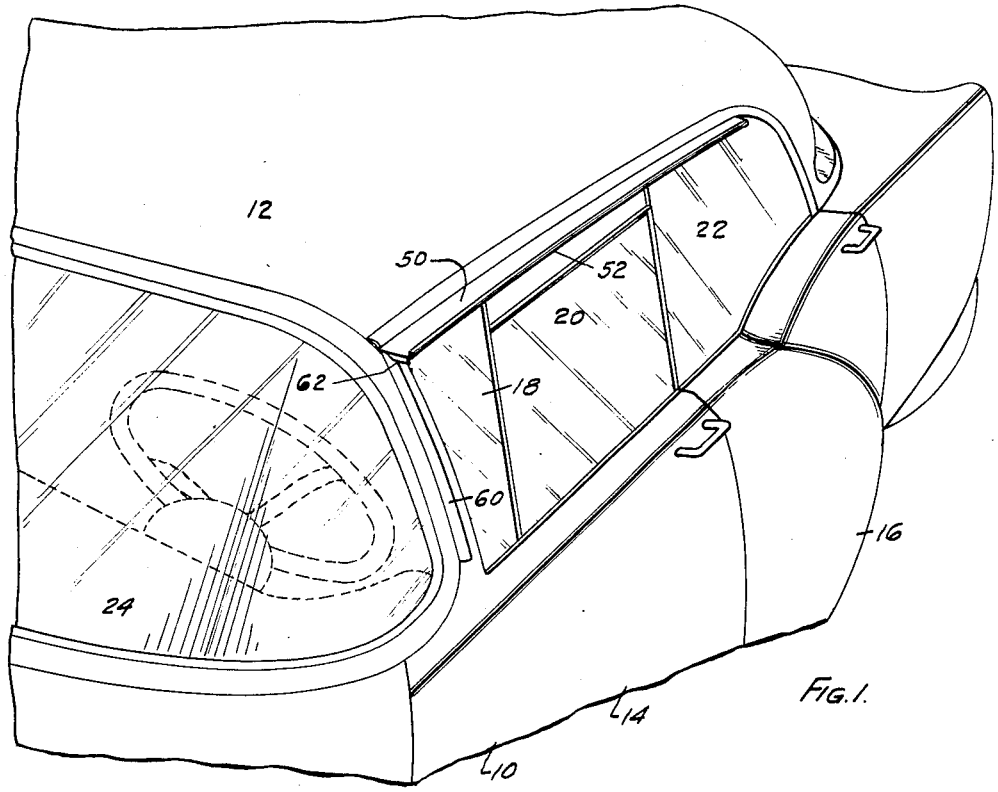
Fig. 1 is a front perspective view of one type of hard-top automobile showing the rain shade or visor and support post or plate associated therewith.
Figure 2:
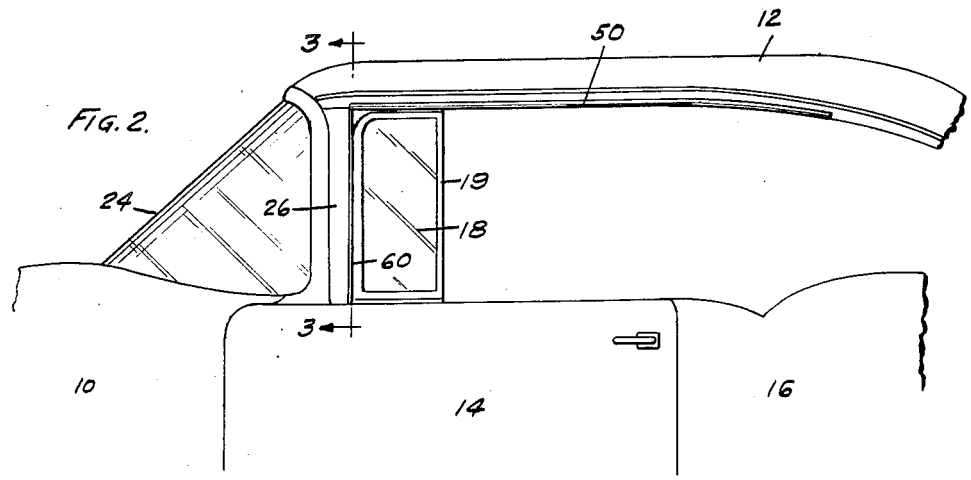
Fig. 2 is a side elevational view thereof.

In the embodiment of the invention which I have chosen to illustrate and describe the same, I have shown one of the present day sport cars 10 which is provided with the hard-top or roof 12 and doors 14 and 16, differing from the usual type of automobiles in that no floor-to-roof post is provided between the front and the rear door of the automobile. In this type of car the front door 14 has a relatively narrow vertically disposed window 18 associated therewith, the window capable of partial rotation about a vertical axis to provide what is called a "vent wing." A second window 20 is provided in the front door which is normally raised and lowered without association with a frame at the back edge of the same, the back window 22 being raised or lowered in a slightly arcuate or tilting action to fit into a window pocket in the back door 16.

In the usual construction of automobiles of this type, the front door 14 is hingedly connected to a support adjacent the visor 24 and normally swings shut against a front post 26, the window 18 being mounted for vertical pivoting in a rigid frame 19 secured on the top of the door 14.

The post 26 terminates against the inner roof section 28, the same being fastened to the outer roof section 30 and having a trim or moulding 32 associated therewith. The trim 32 has a flat horizontal ledge 34 which extends inwardly towards the inner roof portion 28 and fastens a flexible moulding strip 36 therebetween, the strip being in contact against the inner side of the window frame when the window is raised to effect a leak-proof connection. A rubber extrusion or grommet 38 is adapted to be fastened along the entire lower edge of the horizontal flange 34 of the trim 32 by conveniently spaced screw members 40, the rubber extrusion shaped as shown in Fig. 3 with a flat base portion 42 and an inwardly turned lip portion 44 which confines a resilient filler block 46 in the cavity provided between the moulding strip 36 and the lip 44 of the rubber extrusion 38.

The rain shade which I have provided may comprise the elongated highly polished stainless steel body member 50 that has one curled-over edge 52 throughout its length. To cooperate with the same I provide a front post support plate 54 which has a longitudinal portion 56 shaped to conform to the front post 26 of the automobile and also has openings 58 therein coinciding with the location of the screw members that fasten the front post together. The support plate has a longitudinal flat portion 60 which extends outward from the edge of the front post of the automobile providing an elongated wind and noise deflector in cooperation with the visor above described.

As can be seen, the openings 58 in the support plate are elongated and washers 71 are provided to receive the Allen head screw members 59 which are normally provided in the front post. The screw members are not always in the same exact location, and for this reason the elongated openings are provided so that the front support plate can be readily fastened on the front post with the same screws.

As a modified way of supporting the support plate 56, I have provided the rectangularly shaped holders or braces 57 which may be utilized together with the washers 71 to fasten over the flattened portion 60 of the support plate and thus hold the support plate in place without the necessity of making holes in the same.

The visor has a down-turned lip portion 62 which is engaged by the upper edge 61 of the support plate 56, the visor being supported additionally throughout its length by being inserted between the base 42 of the rubber extrusion 38 and the flange 34 of the trim 32. This is done by loosening the screws 40 to press the edge of the visor into place against the same and then fastening the screws, by which action the visor is effectively held in position and will stay in position throughout the normal life of the same.

Thus it can be seen that the visor which I have provided is easily and quickly attached to hard-top automobiles of the type that are on the market today, the front support plate furnished therewith providing additionally a wind and noise deflector at the edge of the vent wings of the automobile.

While I have illustrated and described a specific embodiment of the invention, it will be apparent to those skilled in the art that changes and modifications may be made in the exact details shown and I do not wish to be limited in any particular; rather what I desire to secure and protect by Letters Patent of the United States is:

1. The combination with an automobile having a front door support post and a hard-top connected between the same and the back of the car, the top having a rubber extrusion fastened along the bottom edge of the top to receive the windows when raised, of a rain-shade visor attached between the rubber extrusion and the edge of the top, said visor comprising a thin elongated trim strip having a curled up edge along one longitudinal edge, the front end being turned down and a front post support plate overlying said front turned down edge and adapted to be fastened to the front support post of a hard-top automobile.

2. The combination with an automobile having a front door support post and a hard-top connected between the same and the back of the car, the top having a rubber extrusion fastened along the bottom edge of the top to receive the windows when raised, of a rain-shade visor attached between the rubber extrusion and the edge of the top said visor comprising a thin elongated trim strip having a curled up edge along one longitudinal edge, the front end being turned down and a front post support plate overlying said front turned down edge and adapted to be fastened to the front support post of a hard-top automobile, said front post support plate having a flange extending down along the side of the door post.

References Cited in the file of this patent

UNITED STATES PATENTS

| | | |
|---|---|---|
| 1,474,316 | Clark | Nov. 13, 1923 |
| 2,468,439 | Gregorious | Apr. 26, 1949 |
| 2,583,759 | Williams et al. | Jan. 29, 1952 |
| 2,635,918 | Muckle | Apr. 21, 1953 |

FOREIGN PATENTS

| | | |
|---|---|---|
| 164,758 | Australia | Sept. 17, 1953 |